May 7, 1963
R. SCHARDT
3,088,351
TURRET TOOL BLOCK
Filed May 9, 1960
3 Sheets-Sheet 2
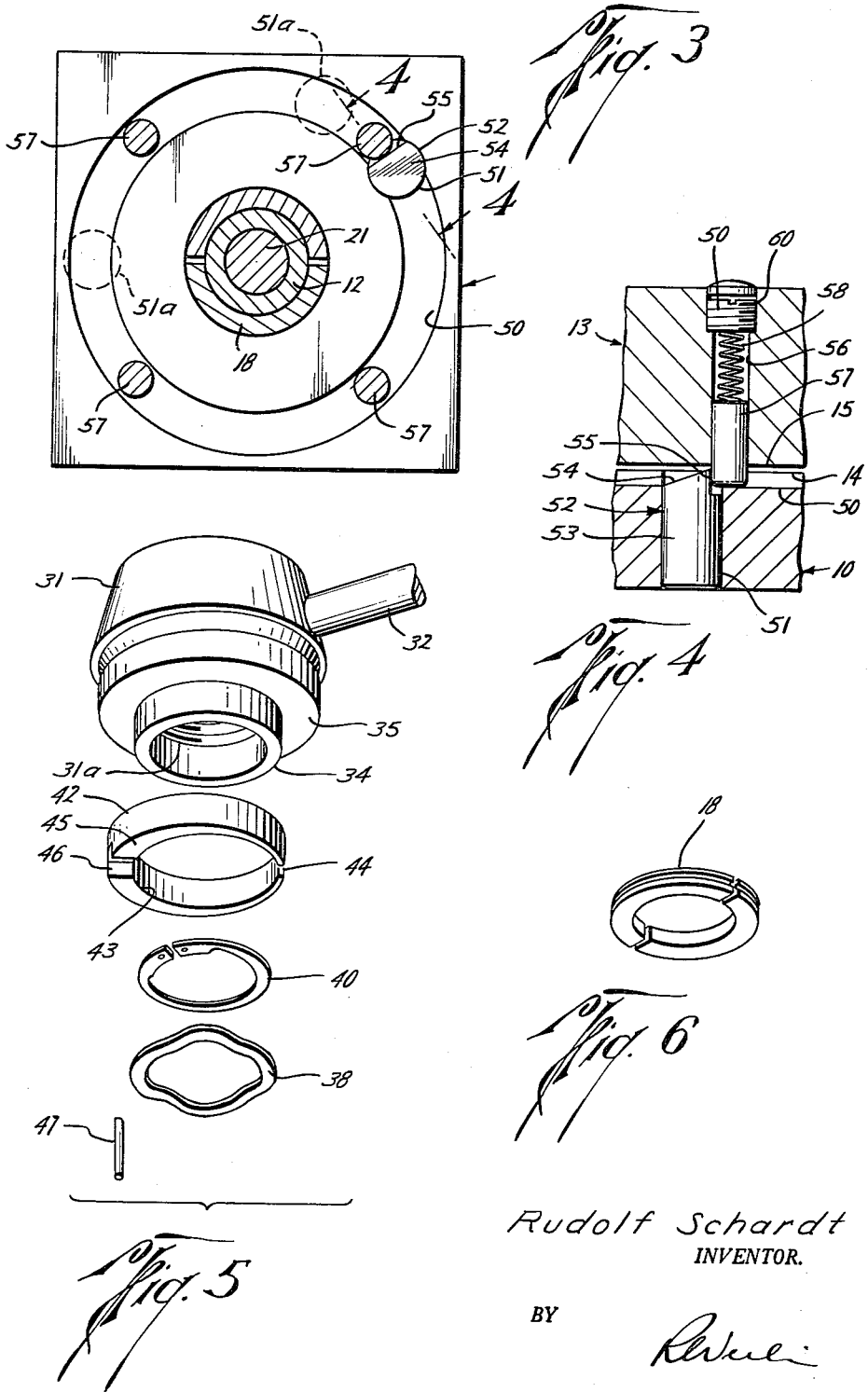
Rudolf Schardt
INVENTOR.
BY
ATTORNEY.

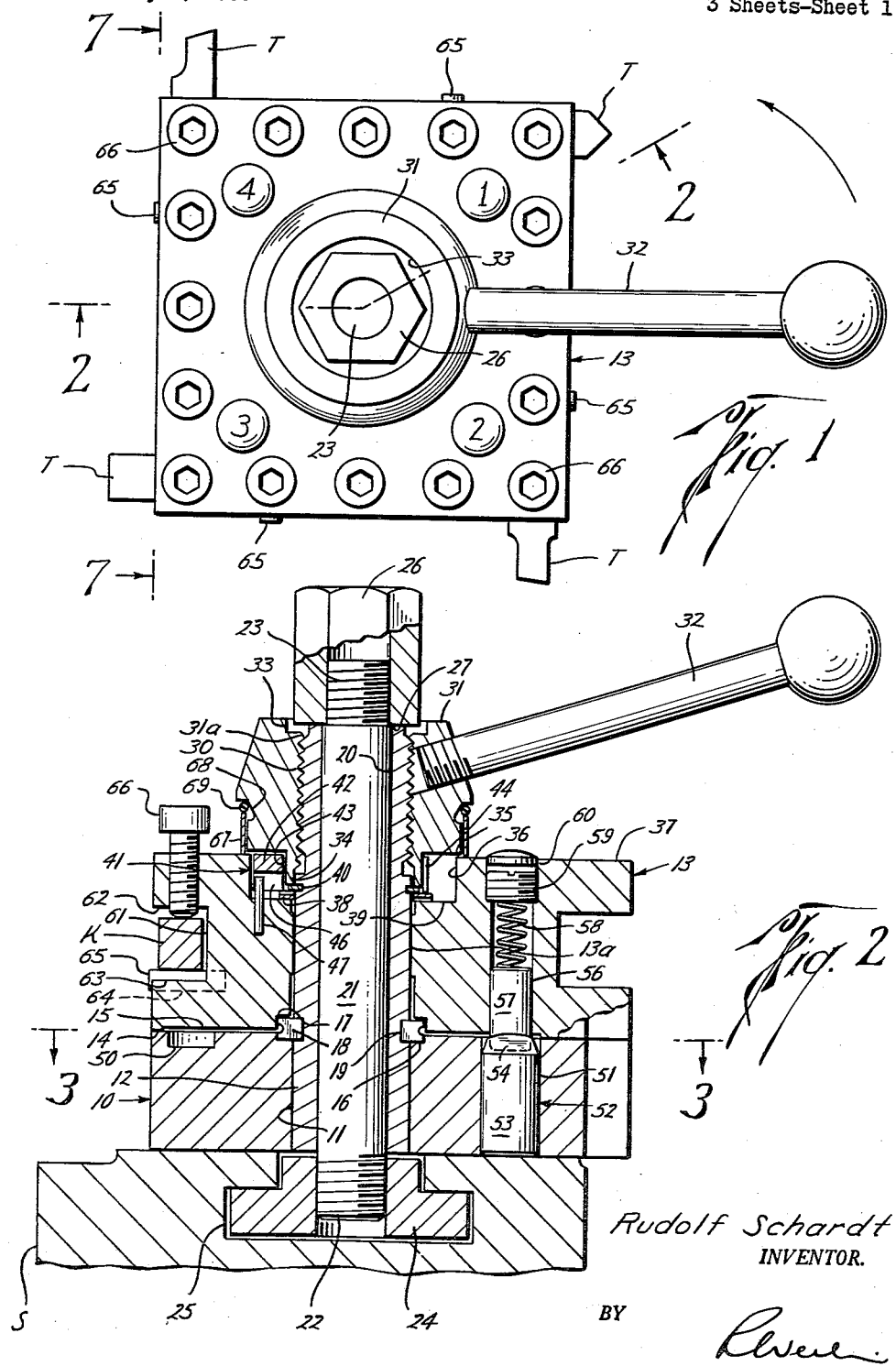

May 7, 1963  R. SCHARDT  3,088,351
TURRET TOOL BLOCK
Filed May 9, 1960  3 Sheets-Sheet 3
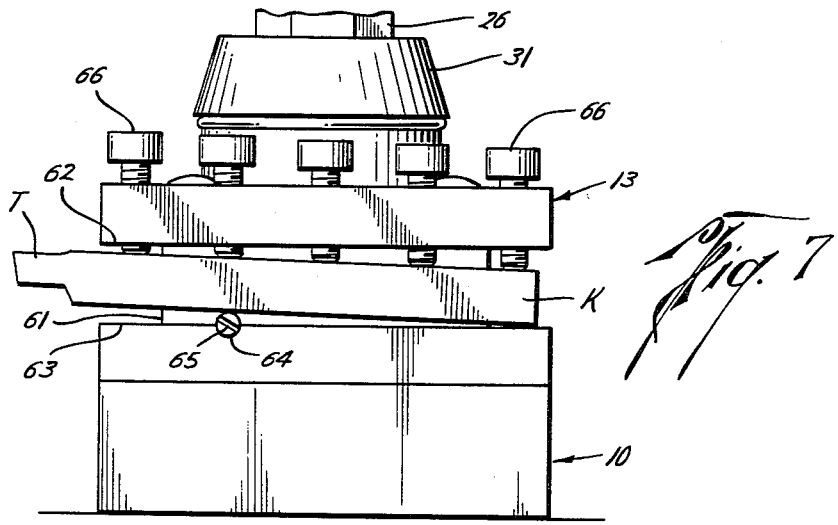
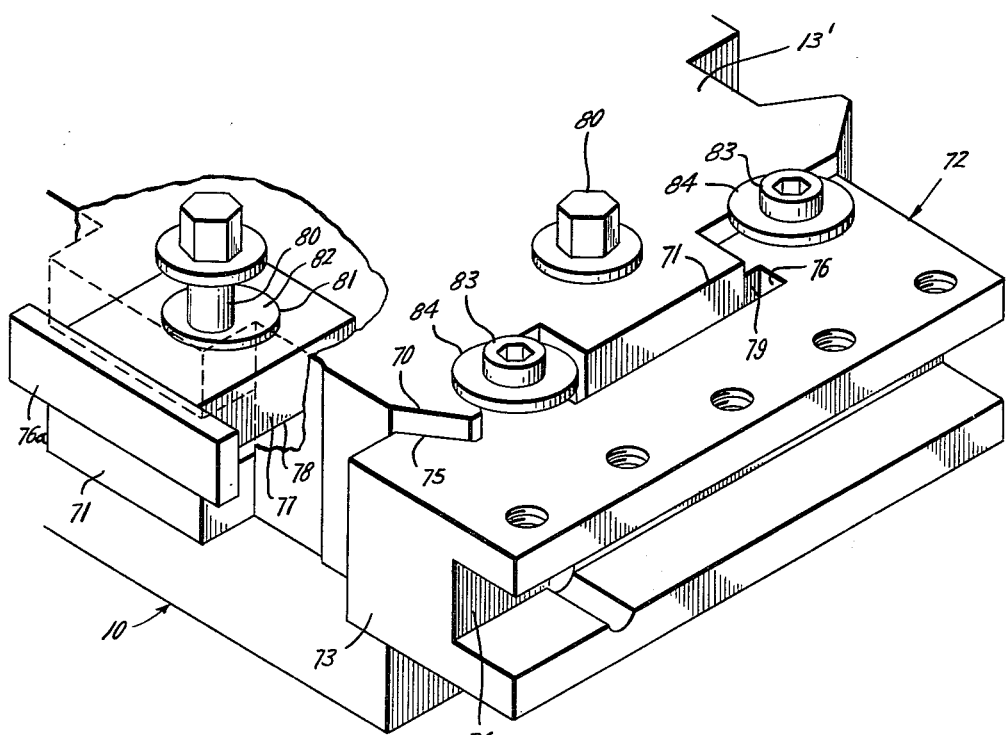
Rudolf Schardt
INVENTOR.
BY
ATTORNEY United States Patent Office 3,088,351
Patented May 7, 1963

3,088,351
TURRET TOOL BLOCK
Rudolf Schardt, 3510 Laverne Drive, Houston, Tex.
Filed May 9, 1960, Ser. No. 27,560
7 Claims. (Cl. 82—36)

This invention relates to indexing turret tool posts or blocks for indexing or locating machining tools relative to work pieces on lathes or like metal working machines.

Turret tool posts or blocks are commonly employed to support a number of different tools in position for selective, and usually successive, presentation to the work piece for performing a series of operations on the work. By having several different tools suitably mounted on the block in pre-set positions for performing their respective operations, it is only necessary to appropriately shift the block from one position to another to present the proper tool to the work as desired.

It is obviously of paramount importance when using such multiple position tool blocks, that the tools be located with utmost precision and securely retained at their working positions.

The present invention has for its principal objects the provision of an indexing tool block which will have the aforementioned desired characteristics; which requires a minimum amount of effort and manipulation for shifting the tools between idexed positions; which employ an improved arrangement for positioning the individual tools in their respective holders; and which is relatively simple in construction and economical to manufacture.

A further object is to provide a modified form of tool block employing holders for the individual tools which are separably mountable on the block whereby any member of different tools may be pre-mounted and suitably adjusted in their individual holders and the latter then mounted on the tool block as needed.

A more specific object is the provision of a tool block, including a base having an upstanding shaft, a tool holder rotatable about the shaft between index positions, a drive nut on the shaft for rotating the tool holder, and an improved form of clutch mechanism between the tool holder and the drive nut by which shifting of the tool block between index positions is greatly simplified and effected with a minimum of effort.

Other and more specific objects and advantages of this invention will become more readily apparent from the following detailed description when read in conjunction with the accompanying drawing which illustrates one useful embodiment in accordance with this invention and a modification thereof.

In the drawing:

FIG. 1 is a top plan view of a tool block in accordance with this invention;

FIG. 2 is a vertical cross-sectional view taken along line 2—2 of FIG. 1;

FIG. 3 is a transverse cross-sectional view taken along line 3—3 of FIG. 2;

FIG. 4 is a fragmentary view, partly in section, of one of the indexing cams and one of the locking pins;

FIG. 5 is an exploded perspective view showing details of the drive nut and clutch elements of the device;

FIG. 6 is a perspective view of one of the details of the device;

FIG. 7 is a side elevational view of the tool block showing a tool mounted in working position on the holder; and FIG. 8 is a perspective view of a fragment of the tool block illustrating a modification employing separable tool holders.

Referring to the drawing, the device includes a base 10, preferably of generally square configuration, having a central bore 11 adapted to receive a tubular shaft 12 which extends upwardly from the base. Rotatably mounted about shaft 12 on top of base 10 is a tool block 13. The upper face 14 of the base and the lower face 15 of the tool holder are provided, surrounding shaft 12, with registering annular grooves 16 and 17, respectively, which are adapted to receive a split lock ring 18 which is fitted in an annular groove 19 formed in the periphery of shaft 12, to lock the shaft against vertical movement with respect to the base, while permitting rotation of tool block 13 about the shaft and relative to the base. Shaft 12 has an axial bore 20 through which extends a stud 21 having threads 22 at its lower end and threads 23 at its upper end, the threads projecting respectively above and below the ends of shaft 12. Threads 22 are adapted to receive a T-shaped nut or key 24, which is shaped to be received in a correspondingly shaped horizontally disposed slot 25 in the usual cross-slide S mounted on a lathe or similar machine. Threads 23, at the upper end of the stud, are adapted to receive a clamping nut 26. When the latter is screwed down tightly, it bears against a shoulder 27 at the upper end of shaft 12 and draws stud 21 upwardly and, through coaction of key 24 and slot 25, acts to clamp base 10 tightly against the upper surface of cross-slide S, and thereby secure the tool block in the required position on the cross-slide. It will be understood that by loosening nut 26 the tool block may be moved longitudinally of slot 25 in order to position the various metal working tools relative to the work.

The upper end portion of shaft 12 is provided with a section of external threads 30 which is adapted to receive a drive nut 31, having an internally threaded bore 31a. Drive nut 31 is fitted with a radially extending handle 32 by which the nut may be turned on threads 30. The upper end of bore 31a is enlarged at 33 to clear the lower end of clamping nut 26. At its lower end, drive nut 31 is reduced in diameter to form the downwardly projecting cylindrical extension 34, co-axial with bore 31a, and to define the downwardly facing annular shoulder 35 on the drive nut. Extension 34 is positioned, when drive nut 31 is screwed down in threads 30, to enter an enlarged counterbore 36 formed in the upper end of holder 13 concentrically surrounding extension 34. The diameter of drive nut 31, at the point where the reduction in diameter is made to provide the extension 34, is somewhat greater than the diameter of counterbore 36, so that the outer edge of shoulder 35 extends radially outwardly over the edge of the counterbore 36 and may bear against the upper surface 37 of the tool holder when drive nut 31 is screwed down sufficiently toward the tool holder. A wavy spring washer 38 is positioned between the bottom wall 39 of counterbore 36 and the lower end of extension 34 and is held in place against bottom wall 39 by means of a split lock ring 40 seated in a suitable groove in the exterior of shaft 12. With this arrangement spring pressure is always maintained against the top of holder 13 to resiliently bias it toward base 10, and thus keep the end faces 14 and 15 in close sliding contact at all times.

Mounted in counterbore 36, between the outer wall thereof and the opposing cylindrical face of extension 34, is a friction clutch, designated generally by the numeral 41, clutch 41 comprises a split clutch ring 42 having an eccentric bore 43 (FIG. 5) which embraces the cylindrical external surface of extension 34. Ring 42 is split at 44 where its wall section is thinnest. The wall portion of the clutch ring diametrically opposite the split portion of the ring defines, by reason of the eccentric bore, the relative thick section 45 which is provided with a slot 46 extending upwardly from its lower end face to receive the upper end of a key or pin 47 projecting upwardly from the bottom of counterbore 36. Pin 47 cooperates with slot 46 to lock ring 42 against rotation, being thereby secured to holder 13. Bore 43 of the ring is made to a nominal diameter slightly smaller than the external diameter of extension 34 so that, by reason of split 44, the clutch ring will act to compressively embrace extension 34 and thus serve as a friction clutch about extension 34. With this clutch arrangement, it will be seen that rotation of the drive nut will act through the frictional engagement of clutch ring 42 with extension 34 to cause holder 13 to rotate about shaft 12 in conducting the indexing operations, which will be more fully described hereinafter.

The upper face 14 of the base is provided with an annular groove 50 concentric with bore 11 and spaced radially therefrom. A cylindrical socket 51 is provided in the bottom of groove 50 for the reception of a cam element 52, the latter having a cylindrical shank 53 which is dimensioned to have a press fit in socket 51. The upper end of cam element 52 has a sloping cam face 54 which rises from the bottom of groove 50 in the counter-clockwise direction and terminates at about the level of face 14 in a vertical stop face 55 extending transversely of groove 50 (FIG. 4). Tool holder 13 is provided with a plurality of vertically extending cylindrical bores 56 which are positioned at points on a circle adapted to register with groove 50. Each of the bores 56 has slidably mounted therein a cylindrical locking pin 57 which is resiliently urged downwardly in its bore 56 by means of a biasing spring 58 mounted in compression between the upper end of locking pin 57 and a screw 59 threadedly inserted in a threaded socket 60 provided in the upper end of bore 56. The action of spring 58 is to urge the lower end of pin 57 downwardly out of the lower end of bore 56 against the bottom of groove 50 and to thereby ride over cam face 54 during rotation of holder 13 relative to base 10. The number of the locking pins and their relative positions may, of course, be varied. In the embodiment illustrated, four pins are shown spaced 90° apart in cooperation with a single cam 52, so that the holder may be shifted 90° to four successive positions, if desired. Other sockets 51a, shown in broken lines in FIG. 3, may be provided for positioning the locating cams at different angles.

Each of the sides of holder 13 is provided with a horizontal slot 61 extending longitudinally along the side face of the holder and having top and bottom walls 62 and 63, respectively. Slot 61 is adapted to receive a suitable metal working tool T having a shank K of any generally suitable and conventional shape, which, in the illustration, is generally rectangular in cross-section, enabling it to be seated well within the slot 61. In order to position the tools T effectively in the respective slots, the bottom wall 63 of each of the slots is provided with a transverse cylindrical groove 64 adapted to receive a cylindrical bearing pin 65, a segment of which projects above the surface of wall 63. Grooves 64 are located closer to the ends of the slot from which the working tips of the tools T project, so that bearing pins 65 serve as rocker bearings beneath the lower faces of the shanks K. A plurality of set screws 66 are spaced longitudinally along the several edges of holder 13 in alignment with the slots 61 and extend downwardly through upper walls 62 into the slots 61 to bear against the upper surfaces of shanks K. By shifting the tool longitudinally in the slot and by appropriate adjustment of the set screws 66, as best illustrated in FIG. 7, the working tip of the tool T can be positioned at any desired elevation with respect to the holder and the work to which it is to be applied. By employing the cylindrical bearing pins 65, the conventional shims, usually used to position the metal working tools, may be eliminated and the positioning of the respective tools is thereby greatly simplified.

The device is provided with a seal means adapted to exclude dirt, cuttings, metal chips, and the like from between drive nut 31 and the upper surface 37 of the tool holder, so as to prevent fouling of the clutch mechanism and other relatively movable parts. For this purpose, a sleeve 67 is positioned concentrically about the exterior of drive nut 31, so that its lower end will bear against surface 37 outside of counterbore 36. Beginning at a point just above the upper end of sleeve 67, the exterior of drive nut 31 is machined to form a downwardly and inwardly tapering annular groove 68. A resilient ring member 69, such as a rubber O-ring, is seated in groove 68 to bear on the upper end of sleeve 67. As drive nut 31 is unscrewed in shifting the tool holder, ring 69 will tend to slip or roll down the inclined surface of groove 68 and will thereby maintain downward pressure against the upper end of sleeve 67, whereby to maintain the lower end of the sleeve in close engagement with surface 37.

The operation of the device is as follows: Starting with the holder in one position, as illustrated in FIG. 2, it is desired to rotate the holder 90° to position a second tool T in working relation to the work piece. To accomplish this, handle 32 is turned counter-clockwise, as indicated by the arrow in FIG. 1, about 90°, which serves to unscrew drive nut 31 slightly, thereby relieving its pressure on the top of holder 13. Continued counter-clockwise rotation of the drive nut will now act through clutch 41 to turn holder 13 in the counter-clockwise direction until a locking pin 57, succeeding that illustrated in FIG. 1, passes over cam face 54 and drops behind stop face 55. Thereupon handle 32 is turned back clockwise, which will tend to act through clutch 41 to drag the holder in the clockwise direction, thereby urging locking pin 57 solidly against stop face 59. Clockwise rotation of the drive nut is continued until it is screwed down firmly against the top of holder 13, whereupon machining operations, using the newly positioned tool, may be undertaken.

This simple operation of turning the drive nut first in the counter-clockwise direction a relatively short distance and back again is all that is necessary to index the tools, as desired. A minimum of manipulation is thus required to shift the tools and the entire operation is performable with a minimum of physical effort, because very little effort is required to rotate the drive nut. The initial releasing movement of the drive nut, while relieving the pressure from the top of holder 13, will not cause the latter to separate from the upper face of base 10, because of the continually maintained downward spring pressure effected through spring washer 38 and lock ring 40 against the holder. By thus maintaining close sliding engagement between surfaces 14 and 15 of the base and the holder, respectively, during the shifting of the holder, entrance of cuttings or dirt between the sliding surfaces is thus greatly obviated.

FIG. 8 illustrates a modification of the turret block, as previously described, in providing individual tool holder blocks which are separable from the tool holder itself. A tool holder 13$^1$ is shown in partial external outline. It will be understood that the structural elements for rotatably mounting the same on a central shaft in relation to the base 10, the clutch arrangement, and the operating mechanism, are identical with the structural elements illustrated in the previously described embodiments, and these details are, therefore, not shown in this view. The several sides of holder 13$^1$ are each formed to provide a V-shaped outwardly extending vertical spline 70 and an outwardly extending rectangular spline or guide block 71 spaced longitudinally from spline 70. An individual tool clamp 72 comprises a generally rectangular elongate body 73 having a longitudinal slot 74 extending along its outer face. Slot 74 is in all respects identical with slot 61 in the previously described embodiment, and is adapted to receive a tool (not shown) just as previously described, which is clamped in the slot in the same manner as previously described. The inner face of body 73 is provided, near one end, with a vertically extending V-shaped groove 75, which is complementary to spline 70 and adapted to receive the same, and is also provided at a point longitudinally spaced from groove 75 with a vertically extending T-shaped slot 76 to receive the rectangular spline 71 when the body is slid downwardly along the side face of holder 13¹. A horizontally disposed T-shaped clamp, comprising the T-head 76a and the horizontally disposed shank 77, is slidably mounted for movement inwardly and outwardly of spline 71 in a horizontal slot 78 which extends from the outer face of spline 71 inwardly thereof into the body of holder 13¹. T-head 76a projects forwardly of spline 71 and its ends project short distances beyond the side edges of spline 71 in order to be positioned behind the faces 79 in T-slot 76. A crank pin 80 extends vertically through a suitable opening in the top of holder 13¹ and into a journal 81 extending downwardly and centrally through shank 77 of the T-clamp. Crank pin 80 has an eccentric circular cam 82 thereon, the outer diameter of which fits snugly in journal 81. With this arrangement, it will be seen that rotation of crank pin 80 will serve to reciprocate the T-clamp and move T-head 76a inwardly and outwardly with respect to the outer face of spline 71. When tool block 72 is slipped vertically downwardly over splines 70 and 71, T-head 76a will enter T-slot 76 in front of surfaces 79. Thereupon, by appropriate rotation of crank pin 80, the T-clamp will be drawn inwardly of holder 13¹ to retract T-head 76a which will engage surface 79 and thereby draw tool block 72 tightly against the outer face of holder 13¹. The co-action of the tapered surfaces of spline 70 and groove 75 and the abutting engagement of the inner face of block 72 against the outer face of holder 13¹ will rigidly fix the tool block on holder 13¹. A pair of studs 83—83, carrying enlarged flanges 84, are threaded into the top of block 72 near its rearward edge on opposite sides of spline 71 so that flanges 84 will overhang the top of the forward edge of holder 13¹. By suitable adjustment of these studs the vertical position of block 72 and the tool supported thereon relative to the work may be effectively established.

By using an individual separable tool block, such as the block 72, in which to mount a tool, any number of them can be pre-prepared and kept on the shelf. Then as a particular tool is required, it can be installed on tool holder 13¹ and locked into place with a minimum of effort and with great precision, with respect to the work.

From the foregoing, it will be seen that this invention provides an improved form of turret tool block which fulfills the several objects noted above.

It will be understood that various alterations and changes may be made in the details of the illustrative embodiments within the scope of the appended claims, but without departing from the spirit of this invention.

What I claim and desire to secure by Letters Patent is:

1. A turret tool block, comprising, a base, a shaft extending upwardly therefrom and having an externally threaded upper end section, a tool holder rotatably mounted on said shaft, cooperating elements extending between the base and the holder operable by rotation of the holder relative to the base to locate said holder in a plurality of index positions, and means for rotating said holder between said positions comprising, a drive nut threadedly mounted on said upper end section operable to releasably clamp the holder to the base, the exterior of said drive nut having a cylindrical section coaxial with said shaft, and clutch means secured to said holder comprising a split ring having an eccentric bore compressively embracing said cylindrical section whereby rotation of said drive nut about said shaft will rotate said holder relative to said base.

2. A turret tool block, comprising, a base, a shaft extending upwardly therefrom and having an externally threaded upper end section, a tool holder rotatably mounted on said shaft, cooperating elements extending between the base and the holder operable by rotation of the holder relative to the base to locate said holder in a plurality of index positions, and means for rotating said holder between said positions comprising, a drive nut threadedly mounted on said upper end section operable to releasably clamp the holder to the base, spring means disposed in compression between said shaft and said holder, the exterior of said drive nut having a cylindrical section coaxial with said shaft, and clutch means secured to said holder comprising a split ring having an eccentric bore compressively embracing said cylindrical section whereby rotation of said drive nut about said shaft will rotate said holder relative to said base.

3. A turret tool block according to claim 1, wherein said tool holder has a plurality of tool-receiving receptacles along the side walls thereof, each of said receptacles comprising a slot extending longitudinally of the side wall and having vertically spaced top and bottom walls, a cylindrical bearing pin seated transversely in the bottom wall to form a rocker bearing for the shank of a tool mounted in said slot, and means for clamping said tool shank against said bearing and said bottom wall.

4. A turret tool block according to claim 3 wherein said tool holder comprises, a central body having a peripheral wall, a tool holding receptacle removably mountable along said wall, means for locating said receptacle in longitudinally fixed position along said wall, said last-mentioned means comprising a pair of longitudinally spaced vertically extending splines projecting from said wall, complementary spline-receiving grooves in the face of said receptacle opposing said wall, means carried by the receptacle engageable with the body to adjustably fix the vertical position of said receptacle on said body, and means extending between the body and said receptacle to draw the receptacle laterally tightly against said wall.

5. A turret tool block according to claim 4 wherein one of said splines is generally V-shaped on transverse cross-section and the other of said splines is generally rectangular in shape.

6. A turret tool block according to claim 4 wherein said receptacle comprises an elongate body having a longitudinal tool-receiving slot in the face thereof opposite said face having said complementary spline-receiving grooves therein, and means for positioning a tool in said slot.

7. A turret tool block, comprising, a base, a tubular shaft extending upwardly therefrom and having an externally threaded upper end section, means including a stud extending through the bore of said shaft for releasably securing said base to a supporting member, a tool holder rotatably mounted on said shaft, cooperating elements extending between the base and the holder operable by rotation of the holder relative to the base to locate said holder in a plurality of index positions, and means for rotating said holder between said positions comprising, a drive nut threadedly mounted about said upper end section operable to releasably clamp the holder to the base, the exterior of said drive nut having a cylindrical section coaxial with said shaft, clutch means secured to said holder comprising a split ring having an eccentric bore compressively embracing said cylindrical section to drivingly connect said drive nut to said holder, and spring means disposed in compression between said shaft and the holder.

References Cited in the file of this patent

UNITED STATES PATENTS

| | | |
|---|---|---|
| 1,400,614 | Lovejoy | Dec. 20, 1921 |
| 2,364,329 | Waldo et al. | Dec. 5, 1944 |
| 2,621,396 | Grocchi | Dec. 16, 1952 |
| 2,850,790 | Farnsworth | Sept. 9, 1958 |